(12) United States Patent
Sigalas et al.

(10) Patent No.: US 8,562,702 B2
(45) Date of Patent: Oct. 22, 2013

(54) ABRASIVE COMPACT

(75) Inventors: Iakovos Sigalas, Springs (ZA); Kekeletso Mlungwane, Springs (ZA); Mathias Herrmann, Springs (ZA)

(73) Assignee: Element Six Abrasives S.A., Luxembourg (LU)

( * ) Notice: Subject to any disclaimer, the term of this patent is extended or adjusted under 35 U.S.C. 154(b) by 516 days.

(21) Appl. No.: 12/670,229

(22) PCT Filed: Jul. 23, 2008

(86) PCT No.: PCT/IB2008/052953
§ 371 (c)(1),
(2), (4) Date: Aug. 25, 2010

(87) PCT Pub. No.: WO2009/013713
PCT Pub. Date: Jan. 29, 2009

(65) Prior Publication Data
US 2010/0307067 A1 Dec. 9, 2010

Related U.S. Application Data

(60) Provisional application No. 60/951,290, filed on Jul. 23, 2007.

(30) Foreign Application Priority Data

Jul. 23, 2007 (ZA) .................................. 200706085

(51) Int. Cl.
| | |
|---|---|
| *B24D 3/00* | (2006.01) |
| *B24D 11/00* | (2006.01) |
| *B24D 18/00* | (2006.01) |
| *B24D 3/02* | (2006.01) |
| *C09K 3/14* | (2006.01) |

(52) U.S. Cl.
USPC ............................................. 51/307; 51/293

(58) Field of Classification Search
USPC .................................................... 51/293, 307
See application file for complete search history.

(56) References Cited

U.S. PATENT DOCUMENTS 8,113,104 B2 * 2/2012 Lucuta et al. ................ 89/36.02
2004/0247873 A1 12/2004 Gordeev et al.

OTHER PUBLICATIONS

Ekimov, E. A. et al., "Mechanical Properties and Microstructure of Diamond-SiC Nanocomposites", Inorganic Materials, vol. 38, No. 11, pp. 1117-1122 (Nov. 2002) XP002505360.
Gordeev, S. K. et al., "Low-Pressure Fabrication of Diamond-SiC-Si Composites", Inorganic Materials, vol. 37, No. 6, pp. 579-583 (Jun. 2001) XP002505361.
Li, J. et al., "Reactive Wetting in the Liquid-Silicon/Solid-Carbon System", Journal of the American Ceramic Society, vol. 79, No. 4, pp. 873-880 (1996) XP002505362.

* cited by examiner

*Primary Examiner* — Shuangyi Abu Ali
(74) *Attorney, Agent, or Firm* — Oblon, Spivak, McClelland, Maier & Neustadt, L.L.P.

(57) ABSTRACT

The invention relates to an abrasive compact comprising a mass of diamond particles and a silicon containing binder phase wherein the diamond particles are present in an amount less than 75 volume % and the binder phase contains less than 2 volume % unreacted (elemental) silicon. The invention further relates to a method of producing an abrasive compact including the steps of forming a feed diamond powder into a diamond preform, interposing a separating mechanism between the diamond preform and a silicon infiltrant source, heating the diamond preform and silicon infiltrant source until the infiltrant is molten and the preform and infiltrant are isothermal and allowing infiltration from the molten silicon infiltrant source to occur into the diamond preform.

12 Claims, 7 Drawing Sheets

Infiltrated part

ABRASIVE COMPACT

INTRODUCTION

This invention relates to a diamond compact body comprising diamond particles bonded together by a silicon-containing binder or bonding phase. Such compacts are well-known in the art and are useful as an abrasive, cutting tool, nozzle or other wear-resistant part. The invention extends to a method of manufacturing such a diamond compact body.

BACKGROUND OF THE INVENTION

Diamond is the hardest material known to man. Because of this, it finds extensive industrial application where ultra-hard material properties are needed. Due to its high hardness, it is difficult to make diamond tools of different shapes and sizes purely from cutting and shaping diamond. This has led to the development of diamond composite materials which consist of small diamond grains either sintered together through a liquid phase sintering process, or held together in a matrix by a binder phase material. The former process gives rise to the class of polycrystalline diamond materials (PCD), while the latter results in a number of composite materials, of which the foremost is that of SiC-diamond composites. The introduction of the second phase improves the formability and the fracture toughness of such diamond-based material.

Metallic phases such as cobalt are present in PCD and are commonly used as liquid phase sintering aids in the production of that material. These metals however were found to catalyse the graphitization of diamond thus limiting the application temperatures of these PCD materials to below 1000° C. Silicon carbide has been found to be exceptionally good as a diamond binder phase. Because of the structural similarities between diamond and silicon carbide, a strong bond forms between them that results in a material with very strong adhesion between the diamond grains and the SiC matrix. SiC is commonly formed in situ from the reaction between diamond and/or amorphous carbon or graphite with silicon. SiC does not react with diamond and hence the composite material can be used at temperatures above 1000° C. However, the application temperature may be limited by the melting temperature of silicon if some unreacted silicon is present in the final product.

There are two different generic routes of production of these composites:
  mixing of a powdered silicon source with diamond particles and densification of the mixture under pressure with temperature (reaction sintering), or
  infiltration by a silicon-containing melt of a preform made from diamond powder or from mixtures of diamond with graphite or resin.

Reaction sintering to obtain fully dense compacts is only relatively straightforward under the high-pressure high-temperature (HpHT) conditions typically associated with diamond synthesis. Under low pressure conditions (such as Hot Pressing (HP) and Hot Isostatic Pressing (HIP)), the volume decrease associated with the local formation of SiC from the intermingled silicon source and diamond may well result in residual porosity. Therefore a pressure high enough for densification of the reacted compact such as diamond stable conditions can be necessary. This requirement for high or ultra high pressure limits the application of these materials due to production costs and the limited sizes and shapes accessible with this technique.

On the other hand, infiltration has been successfully utilised in generating fully dense composites even at low pressure conditions. This is explained by the fact that even if/as pores are generated within the structure during sintering, liquid phase is continuously wicked up from the infiltrant source to fill these pores. Effective infiltration therefore requires that the pores or channels in the preform structure remain open for infiltration. The limitation imposed by this pore size and density requirement means that infiltration has been chiefly employed for the manufacture of larger-grained diamond compacts, or those with a wide diamond grain size distribution. Even under HpHT conditions (7.7 GPa, 1400-2000° C.), infiltration of diamond powder with primary grain size of ~10 nm but secondary particle (agglomerate) size of approximately 1 µm was only possible to a depth of 2 mm.

This pore retention problem is exacerbated by the ongoing formation of SiC within the preform. SiC formation from the interaction of molten Si infiltrant and the carbon source is accompanied by volume expansion of the solid phase. This reduces the size of the existing pore channels and can result in blockage thereof. This especially becomes a matter of concern for fine-grained preforms, which already have an extremely fine pore structure. An additional concern is that the formation of SiC is strongly exothermic, which further accelerates the reaction in a runaway effect.

Infiltration has a further advantage in that the purity of the silicon source can be more adequately controlled through the use, for example, of a monolithic silicon wafer. By contrast, a reaction sintering or admixing technique typically requires that a very fine powder be used in order to maximise microstructural homogeneity. This brings with it the associated impurities of high surface area particles, as well as concomitant contamination introduced during the preparative mixing or milling process.

A further issue in the generation of diamond-SiC compacts relates to the presence of free or elemental silicon in the final binder phase. The thermal stability of a compact containing discernible free silicon may be limited by the melting point of silicon, as the bond between diamond and binder phase can be compromised at this point. Typically the presence of free silicon is the mark of an incomplete reaction with the carbon source. This may occur where substantial SiC formation has masked or blocked off the silicon melt from carbonaceous material, as diffusion of these species through SiC is significantly slower than that along the grain boundaries U.S. Pat. No. 4,124,401 describes a diamond compact comprising a mass of diamond crystals adherently bonded together by a silicon atom-containing binder. The compact is made by infiltration under relatively mild hot pressing conditions (<1 kbar), where pressure is applied to dimensionally stabilise the diamond mass before and during infiltration. The resultant binder comprises SiC and a further carbide and/or silicide of a metal component which forms a silicide with silicon. The diamond density of the compact ranges from 70-90 volume %. The metal component for the diamond body is selected from a wide group of metals such as cobalt, chromium, iron etc.

U.S. Pat. No. 4,151,686 describes a diamond compact similar to that of U.S. Pat. No. 4,124,401 save that the resultant binder comprises SiC and elemental or free silicon. The substantially pore-free compact is generated at significantly higher pressures (in excess of 25 kbar) through infiltration by an elemental silicon melt. These high pressures are required in order to achieve the characteristic high diamond density of the compact (from 80-95 volume %).

U.S. Pat. No. 4,664,705 discloses a method that infiltrates a silicon alloy through a previously intergrown polycrystalline diamond body, that was initially sintered in the presence of a transition metal solvent/catalyst, where this previous binder has been leached out. SiC forms in situ through the reaction of the molten silicon with the intergrown diamond at HpHT.

U.S. Pat. Nos. 6,939,506 and 7,060,641 describe the manufacture of fully dense diamond-SiC composites by reaction sintering at HpHT conditions (namely 5 GPa and temperatures between 600-2000° C.). The reagent mix is prepared by reactive ball-milling of diamond powder (5-10 µm particle size) and crystalline silicon powder. At higher sintering temperatures, the SiC binder that forms is nanocrystalline in nature; whilst at lower temperatures residual unreacted elemental silicon tends to remain in the binder phase. These compacts had a minimum possible calculated diamond content of 77 mass %. It was observed that ball-milling serves to transform the silicon to the amorphous state, which was critical in determining the nanocrystalline nature of the binder.

Another approach to the formation of SiC-diamond compacts is disclosed in U.S. Pat. No. 5,010,043 and associated applications. In a specific embodiment of this process, reaction sintering of a diamond-silicon mixture is employed together with silicon melt infiltration to form diamond-SiC compacts with a diamond density of 50-85 volume %. The silicon admixed within the compacts is postulated to melt and wet the surfaces of the diamond particles, establishing a continuous capillary system for infiltration. The compact formation conditions are intermediate between conventional HpHT and low pressure processes, at 10-40 kbar. Critical to this process is a deliberate plastic deformation step that is observed to significantly improve the properties of the resultant compacts and enable the use of p and T conditions reduced from those of HpHT. Given that it is known in the art that plastically deformed diamond is inherently more reactive than diamond which is not (see U.S. Pat. No. 6,680,914), it may be the case that the improved reactivity of the diamond in this invention is what enables effective bonding at lower p, T conditions. This is consistent with the fact that manipulation of the sintering temperatures generates compacts that contain minimal amounts of free silicon in the binder phase, as the SiC formation reaction has been maximised.

It is also known in the art to produce diamond-SiC compacts where the carbon source for the in situ SiC formation is not dominantly supplied by crystalline diamond but by a carbon introduced or produced on the diamond surface. Both low and higher pressure techniques employing this approach are known.

U.S. Pat. Nos. 4,220,455 and 4,353,953 describe diamond-SiC compacts formed by coating diamond particles with amorphous carbon before infiltrating under partial vacuum with molten silicon. The amorphous carbon is introduced by pyrolysis of organic binder systems such as resins, polymers etc., or by pyrolytic decomposition of carbonaceous gases. An advantage of the resin or polymer approach is that the organic residue can facilitate formability of the pre-sintered diamond. It was additionally observed that non-diamond carbon coatings were highly reactive in the presence of molten silicon, easily wet by it and hence easily formed SiC. However, the binder phase in these compacts still comprised both SiC and unreacted elemental silicon.

U.S. Pat. No. 4,381,271 employs carbonaceous materials such as fibrous graphite as an additional carbon source for SiC formation. These fibres are admixed with coated diamond particles before being infiltrated by molten silicon under a partial vacuum. In the final compact binder both SiC and unreacted elemental silicon were observed.

In most of these cases, any required pyrolysis is carried out to minimise the graphitisation of the diamond; as this is seen as detrimental to the potential properties of the compact. By contrast, U.S. Pat. No. 6,447,852 and associated applications disclose a low pressure infiltration process for the manufacture of diamond-SiC compacts that utilises a deliberate graphitisation step. Preferably 6-30 mass % of the diamond is deliberately graphitised prior to infiltration with molten silicon. It is postulated that the graphitised layer on the diamond surface affects the pore character such that an optimal infiltration environment results. A characteristic of compacts of this invention is the discernible presence of free silicon in the binder phase.

Infiltration remains a preferred method for the manufacture of diamond-SiC compacts because of the opportunity it provides for exploiting low pressure processes. There are significant cost benefits inherent in this approach over using HpHT; and further benefits of being able to access shapes and sizes not viably attainable in HpHT or even medium pressure processes. However, the use of infiltration for finer-grained diamond structures is problematic because of the fine-scale nature of the pore structure and the ease with which these pores can be blocked. Nonetheless, finer-grained structures would be of great interest as high performance composites. Additionally, the generation of a compact containing no discernible free silicon that uses a low pressure infiltration process would have significant cost and technical benefits.

SUMMARY OF THE INVENTION

According to a first aspect to the present invention there is provided an abrasive compact comprising a mass of diamond particles and a silicon containing binder phase wherein the diamond particles are present in an amount less than 75 volume % and the binder phase contains less than 5 volume % unreacted (elemental) silicon or silicide. Preferably the diamond particles are present in an amount of more than 5, more preferably 10, and most preferably 20 volume %; but less than 75, more preferably less than 70 volume %. The compact binder phase is characterised in that, whilst it is dominated by a silicon-based chemistry, preferably there is no detectable free or elemental silicon present in the binder system and the majority of silicon present in the binder phase is silicon carbide SiC. Preferably the SiC in the binder phase is microcrystalline in nature. Preferably the diamond particles are not plastically deformed to a significant degree and the particles typically have an average grain size less than 10 µm, more preferably less than 7 µm and most preferably less than 5 µm. (Average grain size is measured using the largest diameter of each grain or particle.)

Silicide results from the reaction of silicon with impurities such as iron, etc.

Preferably the binder phase of the compact contains less than about 4 volume % unreacted silicon, more preferably less than about 3 volume % unreacted silicon, more preferably less than about 2 volume % unreacted silicon, most preferably less than about 1 volume % unreacted silicon.

Preferably the unreacted silicon content is within the range of 0 to 5 volume %.

Still further according to the invention there is provided a method of producing an abrasive compact including the steps of:
 a. forming a feed diamond powder into a diamond preform,
 b. interposing a separating mechanism between the diamond preform and a silicon infiltrant source
 c. heating the diamond preform and the silicon infiltrant source until the infiltrant is molten and the preform and infiltrant are isothermal, and
 d. allowing infiltration from the molten silicon infiltrant source to occur into the diamond preform.

Preferably the infiltration takes place with the application of mild pressure (<1 kbar). More preferably infiltration takes place while simultaneously removing the separating mechanism.

Preferably the feed diamond powder is coated with a typically amorphous carbon layer through pyrolysis of an appropriate organic binder. The compact may be a compact as hereinbefore described.

SiC-diamond with low Si or other soft phases, preferably none is suitable for armour applications (stopping high velocity projectiles). As such, according to a third aspect to the present invention there is provided armour comprising an abrasive compact as hereinbefore described.

DETAILED DESCRIPTION OF THE INVENTION

Figure 7:
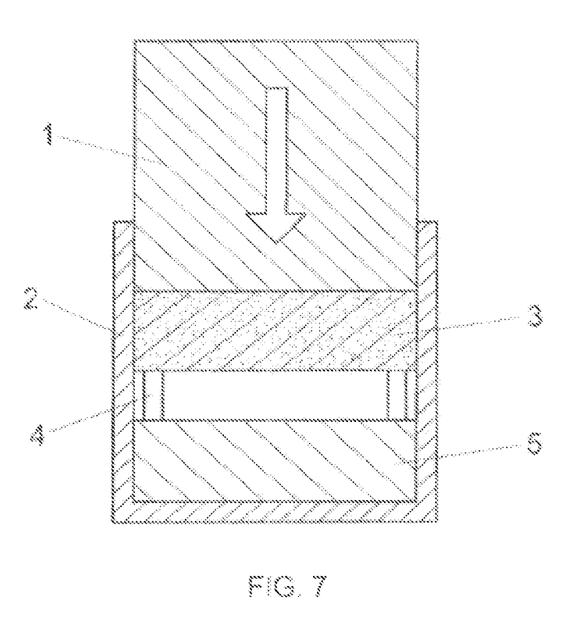
FIG. 7 is an example filtration process embodiment.

In the following description, reference will be made to the following Figures:

FIG. 7 shows an example infiltration process embodiment, and

Figure 8:
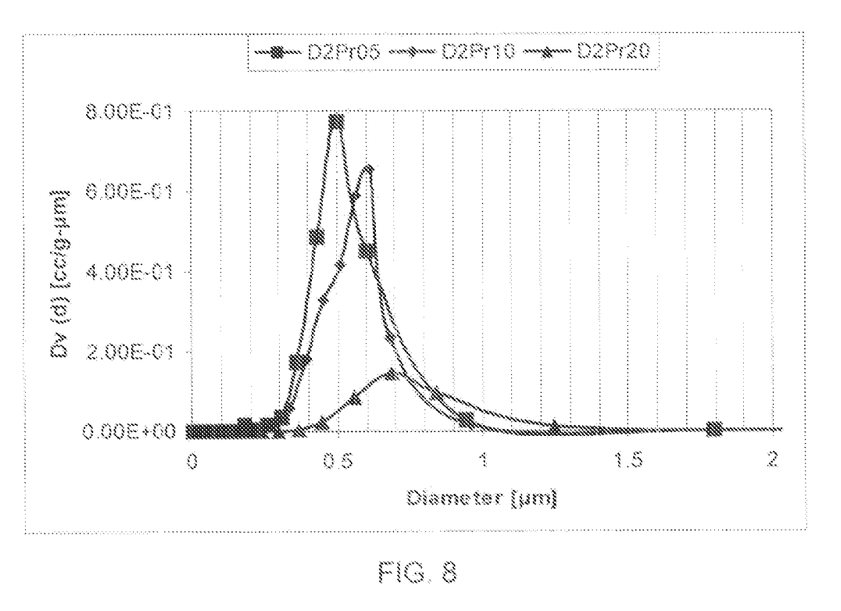
FIG. 8 is a graph showing pore size distributions for diamond preforms.

FIG. 8 shows the pore size distributions for diamond preforms made from a diamond powder with an average particle size of 1.5 μm with three different initial contents of phenolic resin. D2Pr05 shows the pore distribution at 5 mass % resin, D2Pr10 at 10 mass % and D2Pr20 at 20 mass %.

Compacts according to the present invention are typically fine-grained diamond-SiC compacts (where the average diamond grain size is typically less than 10 μm) produced through infiltration of a diamond preform by molten silicon-containing materials. These compacts are unique in that they are free of detectable elemental or free silicon in the final binder microstructure. Further, the diamond in these compacts shows no significant plastic deformation. The compacts of the invention further have a high relative diamond density.

Compacts of the invention comprise a mass of diamond particles distributed in a binder or binding phase. These diamond particles will typically be uniformly distributed throughout the binder phase. In order to achieve a suitable structure, it has been found necessary for the diamond particles to be present in an amount of more than 20, more preferably 30, and most preferably 40 volume %; but less than 75, more preferably less than 70 volume % in the body. The diamond particles may be of natural or synthetic origin. Diamond particles used in a preferred embodiment of this invention have an average grain size less than 10 μm, more preferably less than 7 μm and most preferably less than 5 μm. However, it is observed that many of the advantages of this invention can also be realised where the diamond grain size is coarser than in the preferred embodiment. The diamond particles may have a monomodal, bimodal or multimodal size distribution.

The binder or bonding phase is dominated by a silicon-based chemistry, however, there is less than 2% volume of detectable free or elemental silicon or silicides present in the binder system of the final compact and most preferably there is no detectable free or elemental silicon present in the binder system of the final compact. Typically the method used to detect free silicon is XRD (X-ray diffraction). The binder typically comprises microcrystalline SiC, although other silicon-based chemistries may also occur. The silicon-based source for the infiltrant may be elemental silicon or a suitable silicon alloy—if elemental silicon, it may be in powder or monolithic form.

The compacts of the invention are manufactured using temperatures that ensure that the infiltrant is molten, for example in excess of the melting point of silicon (at approximately 1420° C.); and extremely mild pressures less than 1 kbar. Hence the manufacture process is characterised in that it occurs in the thermodynamic region where diamond is metastable. These conditions will be maintained for a time sufficient to produce the abrasive body.

Preforms for the compacts according to this invention are generated by initially coating the diamond feed diamond powder with a suitable organic binder. In one embodiment of this invention phenolic resin is used as the organic binder, although it will be appreciated that other suitable binders may be used. Appropriate levels for the initial coating are between 5 and 20 mass %, more preferably about 10 mass %. The coated powder is then formed into a green compact by cold compaction. The pore size and pore diameters are controlled either by varying the compaction pressure on the non-pyrolysed resin-diamond preform, or by varying the amount of resin used The green compact is then heat-treated to pyrolyse the organic coating on the diamond powder compact under an inert atmosphere (at temperature conditions where graphitisation of the diamond will not occur). The green compacts generated by this method retain sufficient structural integrity to be handled easily and assembled into the infiltration assembly for subsequent heat-treatment.

The preform is then infiltrated with molten silicon or a silicon-containing alloy. The preform is placed into a suitable reaction container in proximity to a silicon source, with an appropriate separating mechanism being interposed between the diamond preform and silicon source to space the diamond preform and silicon source from each other. The container is heated to a temperature in excess of the melting point of the silicon (approximately 1420° C.) or the silicon alloy; until the diamond preform and silicon source are isothermal, and the silicon source is molten. Gentle pressure (approximately 20 MPa) is then applied in order to bring the preform and melt into physical contact with one another and hence initiate infiltration. Sufficient time is allowed for effective infiltration to occur and then the container is optionally cooled.

The infiltrated compact is then removed from the container and processed appropriately to achieve a suitable final product.

The introduction of a suitable pyrolysed carbon layer onto the surface of the diamond powder is preferable. Without being limited by theory, it is assumed that the increased reactivity of the amorphous carbon generated by the pyrolysis may allow rapid initial SiC phase nucleation on the diamond/carbon surfaces during initial infiltration. Counter-intuitively, this rapid nucleation process appears to result in the formation of a controlled thin SiC layer that effectively acts as a pseudo-barrier to the subsequent diffusion of reactant species. Hence subsequent SiC growth can be somewhat slowed and the potential runaway SiC formation which results in pore blockage in fine-grained structures controlled. As previously discussed, the carbon source in a similar low/no pressure process (such as that disclosed in U.S. Pat. No. 6,447,852 and associated applications) arises from graphitic layers generated in situ from deliberate graphitisation of the diamond powder. This graphite layer, whilst more soluble and reactive than the diamond itself is substantially less reactive than the amorphous carbon layer of this invention. Hence the slower SiC formation in the initial stages does not effectively mask the diamond surface and prevent runaway SiC formation, leading to an increased probability of pore blockage resulting in ineffective infiltration.

Also, the introduction of sacrificial non-diamond carbon supplies the molten silicon with a non-diamond reactant, thus sparing the valuable diamond phase from conversion into the softer SiC one. Furthermore, and very importantly, the introduction of a non-diamond carbon layer on the diamond particles results in an increase of the pore size of the pyrolised diamond preform, as shown in Figure B, thus providing the infiltrating silicon with an easier passage. In the green compact, most of the carbon-supplying resin occupies the pores of the diamond preform during initial compaction. Therefore, the resulting non-diamond carbon that is generated after pyrolysis is located in the diamond preform pores, thus allowing for the diamond volume fraction to remain relatively high while still supplying the advancing molten silicon front with a carbon reactant.

Appropriate selection of the organic binder, required additive levels and suitable pyrolysis cycle requires an understanding of the yield and distribution of the amorphous carbon layer that is generated. Whilst the preferred organic agent of this invention is phenolic resin, it is anticipated that the use of other similar organic materials would be self-evident to those skilled in the art such as paraffin, polysaccharides acrylates etc. The organic binder is additionally useful in that it allows the generation of a pressed green compact that has some strength i.e. can be freely handled and machined. The organic binder of the preferred embodiment is typically introduced into the diamond powder mix in dissolved form in a suitable organic solvent such as acetone. Alternative solution methods such as spraying, or gaseous techniques such as the in situ decomposition of a natural gas on the diamond surface would equally be obvious to those skilled in the art.

Unfortunately, the engineered increased reactivity of the coated fine diamond was observed to result in a premature reaction in the contact region between the preform surface and the silicon infiltrant, whilst the latter was still in the solid state during the heating cycle. This reaction was seen as highly undesirable because the early generation of SiC in this region would easily block the very fine pore structure of a fine-grained diamond preform, resulting itself in incomplete infiltration. This phenomenon was further exacerbated by the increased viscosity of the infiltrant during the early stages of infiltration before it was fully molten. Any drop in temperature from the infiltrant source to the diamond preform was also found to be extremely disadvantageous, as cooling of the infiltrant within the preform had a similar disruptive effect.

The identified problem was therefore to prevent a premature reaction at the interface between the diamond preform and silicon source whilst it was still in the solid state; and to ensure that the diamond preform and molten silicon source were isothermal before they were brought in contact. Any separation mechanism additionally required the facility to be triggered remotely in situ during the sintering cycle.

A set of SiC, SiC-based ceramic foam or graphite felt spacers (stilts) was designed to fit into the interface region between the silicon source and diamond preform. The dimensions of these spacers were chosen such that they did not create a physical barrier per se between the two parts, but interposed a space between them. Hence and by way of example, in the case of an 18 mm diameter preform, three SiC spacers of approximately 2 mm×2 mm×3 mm were used to separate the preform and silicon source. These spacers functioned as effective stilts, maintaining separation between the two parts until, once the silicon source was molten; the application of external pressure forced them down into the molten silicon source and allowed contact. The "stilt" spacers must be of such a material that they remain solid during the course of the reaction and are chemically inert with respect to the infiltration reaction. In addition to the above the "stilts" can also be silicon-infiltrated silicon carbide or recrystalised silicon.

The combined effect of the pyrolytic carbon layer in increasing reactivity, coupled with a pore maintenance; and the physical separation of the infiltrant and preform until infiltration conditions are optimal, allows diamond-SiC compacts with various unique characteristics, namely:

the elimination of free silicon in the binder phase
the effective infiltration of finer-grained diamond preforms
increased diamond density over that achieved with known low pressure infiltration routes due to the use of a non-diamond source for at least a part of the SiC formation.

Essentially, when the diamond content in a compact is high, the likelihood and content of elemental Si being present in the finished article is greatly reduced for the following reasons:

Where the diamond content is high, and especially where the grains are fine, higher pressures are typically required in order to compact the material sufficiently and drive infiltration. Higher pressures may have the benefit of driving the diffusion of Si and C and promoting the reaction to form SiC;

Where the diamond content is high, the pores may typically be relatively smaller, resulting in smaller isolated volumes of unreacted, free Si.

The present invention teaches low or no Si even where the diamond concentration is relatively low and/or the diamond is relatively fine.

The invention is further illustrated by the following non-limiting examples:

EXAMPLE 1

A preform containing diamond powder (average grain size of 1.5 μm) coated with a pyrolytic carbon layer was prepared.

An amount of phenolic resin to give 10 mass % in the diamond mix, was dissolved in acetone at a concentration of approximately 34.3 g/l. This solution was then mixed with the diamond powder and heated in a water bath to 70-80° C., whilst stirring, to evaporate off the acetone. The resulting agglomerated powder was crushed and screened using a −325 mesh screen. SEM micrographs of the coated grit showed that the resin was homogeneously distributed on the diamond surfaces, both before and after pyrolysis A green compact was then formed by cold compaction of the screened powder at ca. 60 MPa. This green compact was then heat-treated at 120° C. in air for 18 hours, in order to cure the resin. The resin coating on the diamond was then pyrolysed by heat treatment under argon. The heating upramp cycle was in two parts: initially up to 450° C. at 2° C./min; followed by heating to 750° C. at 10° C./min. The preform was then held at 750° C. for 1 hour. After cooling, the porosity of the preform was determined to be approximately 30%. From the weight loss it was evident that about half the mass of the resin had volatilised and left the compact.

The preform was then infiltrated with molten silicon under very mild pressure.

A silicon infiltrant source body 5 was placed inside an hBN-coated graphite pot 2 such as that shown in FIG. 7. Three SiC separating spacers 4 (of dimension such that they served a "stilt" function as previously discussed) were placed on top of this source 5. The diamond preform 3 was then placed in the pot 2. An hBN-coated graphite piston 1 was then inserted into the pot 2. The pot 2 was heated to 1500° C. at a rate of 50° C./min. Once the temperature inside the container reasonably exceeded the melting point of silicon (±1420° C.), a pressure of 20 MPa was applied to the piston 1. This brought the preform 3 and molten infiltrant 5 into contact, commencing the infiltration process. The temperature was held at 1500° C. for approximately 30 minutes before cooling. (Pressure was continued even during the cooling cycle until the temperature reached 1300° C.)

The infiltrated sample was recovered from the pot and investigated. Microstructural analysis showed that the compact was well infiltrated to a depth of at least 2.5 mm. The infiltrated volume was observed to be completely free of pores, with a high concentration of diamond. XRD analysis showed only diamond and SiC, with no residual unreacted elemental or free silicon present in the compact. The diamond content of the compact was estimated to be approximately 40 volume %, with the remainder being SiC phase.

EXAMPLES 2-7

Further diamond compacts was prepared according to the method of example 1, save that the diamond average grain size and phenolic resin content were altered as shown in Table A.

TABLE A

Summaries of various characteristics of the compacts produced.

| Example | Diamond grain size (μm) | Preform resin content (mass %) | Infiltration depth (mm) | Phase composition (volume %) | | |
|---|---|---|---|---|---|---|
| | | | | Diamond | SiC | Si |
| 1 | 1.5 | 10 | 2.5 | 40 | 60 | 0 |
| 2 | 9 | 10 | full | 53 | 47 | 0 |
| 3 | 1.5 | 5 | 1.25 | — | — | — |
| 4 | 9 | 5 | 2 | 46 | 51 | 3 |
| 5 | 1.5 | 20 | poor | — | — | — |
| 6 | 9 | 20 | poor | — | — | — |
| 7 | 16.5 | 5 | full | 52 | 40 | 8 |

As is evident from Table A, excess quantities of phenolic resin are undesirable in that they cause a similar pore-blocking effect to that observed without any resin being present. In this case, optimal levels of resin addition at approximately 10 mass % were observed to maximise the infiltration process and reduce the presence of undesirable free silicon.

EXAMPLE 8

The contents of the paper 'The low-pressure infiltration of diamond by silicon to form diamond-silicon carbide composites' as authored by Sigalas, Herrmann and Mlungwane is incorporated herein by reference. For the avoidance of doubt, the paper is set out below:

Abstract

The infiltration of fine-grained diamond preforms by molten silicon is limited by the blocking of the pores as a result of the volume increase during the reaction of diamond with SiC. Therefore in the present paper the infiltration of preforms made with diamond powders with different grain sizes was investigated. The preforms were prepared using phenolic resin as a binder. With increasing resin content the pore size increases, but the pore volume decreases. As a result the infiltration depth increases strongly for medium resin content. For the fine-grained ~1.5 μm diamond preforms, a maximum infiltration depth of 2.5 mm is obtained at 10% resin, whereas at 5% resin only 1.25 mm could be infiltrated.

1. Introduction

Diamond is the hardest material known to man. Because of this, it finds extensive industrial application where ultra-hard material properties are needed. Due to its high hardness, it is difficult to make diamond tools of different shapes and sizes purely from cutting and shaping diamond. This has led to the development of diamond composite materials which consist of small diamond grains either sintered together through a liquid phase sintering process, or held together in a matrix by a binder phase material. The former process gives rise to the class of polycrystalline diamond materials (PCD), while the latter results in a number of composite materials, of which the foremost is that of SiC-diamond composites. The introduction of the second phase improves the formability and the fracture toughness of such diamond-based materials[1].

Metallic phases such as cobalt are present in PCD and are commonly used as liquid phase sintering aids in the production of that material. These metals however were found to catalyze the graphitization of diamond thus limiting the application temperatures of these PCD materials to below 1000° C.[1]. Silicon carbide has been found to be exceptionally good as a diamond binder phase. Because of the structural similarities between diamond and silicon carbide, a strong bond forms between them[2] resulting in a material with a very strong adhesion between the diamond grains and the SiC matrix. Silicon carbide does not react with diamond and the composite material can be used at temperatures above 1000° C. Application temperature is limited by the melting temperature of silicon if some unreacted silicon is present in the final product.

SiC is commonly formed in situ from a reaction between diamond and/or amorphous carbon or graphite with silicon. The silicon can be introduced into the diamond in different ways, either by infiltrating molten silicon into a diamond preform or by reaction sintering silicon powder and diamond powder[3, 4, 5].

The main production route of these composites includes the use of high-pressure and high-temperature in order to achieve sintering within the regions of diamond stability [6]. Use of high pressures however restricts the range of applications of these materials due to high cost of production and the limited range of possible sizes and shapes of the products made. Some attempts[5] have been made to produce this composite material under conditions of low pressure (i.e. in the diamond metastable region). Hot Isostatic Pressing (HIP) method was employed at a maximum pressure applied of 20 MPa. A product more than 90% dense was obtained. It is of great importance to note that for the reaction sintering route, if the reaction proceeds under low pressure conditions, voids are produced within the body because of the volume reduction occurring during the reaction[7].

The advantage of infiltration as stated by J. Qian at al[2], is that the liquid phase keeps filling the pores in the diamond skeleton and hence a more dense material is produced. Infiltration can also be successfully performed at low pressures giving a dense product.

Infiltration on the other hand has been successful under low pressure conditions only for large grained diamond preforms (7-63 µm grain size)[3, 4]. It should be noted that in these materials a wide grain size distribution was used. Even under high pressure (7.7 GPa, 1400-2000° C.), E. A. Ekimov et al.[8] could infiltrate diamond powder with primary grain size of ~10 nm but secondary particle (agglomerate) size of ~1 µm only up to an infiltration depth of 2 mm.

Therefore the aim of this study is to investigate the infiltration of diamond by silicon using minimal pressure, and to analyze the limitations accompanying the infiltration of small diamond grain size preforms.

2. Experimental
2.1. Preform Preparation

Preforms were produced using three different diamond powders, labelled D2, D9 and D17 (Element Six (Pty) Ltd). The characteristics of these powders are given in Table 1. The composition of the diamond preforms was modified by the addition of phenolic resin (Plyophen 602N; Fa. PRP Resin). This component was necessary for the formation of the preform during pressing. It acts as a lubricant and a binder. Resin concentrations of 5, 10 and 20 wt % were investigated. The composition and names of the samples are given in Table 2. For the preparation of the preforms phenolic resin was dissolved in acetone (34.3 g/l) and mixed with the diamond powder. This suspension was stirred continuously while kept in a water bath at 70-80° C. to evaporate off the acetone. The resulting powder is agglomerated, the degree of agglomeration increasing with increasing resin content and decreasing diamond particle size. The agglomerated powder is crushed and screened using a −325 mesh screen. The screened powder is pressed into a green compact of 18 mm diameter and 5 mm height under 60 MPa of pressure for about 5 seconds.

The green compacts were heat treated at 120° C. for 18 hours to cure the resin in air. They were then weighed and the resin pyrolysed under argon by heating at a rate of 2° C./min up to 450° C. followed by 10° C./min up to 750° C. where a dwelling time of 60 minutes was undergone. Cooling to room temperature was carried out at a rate of 10° C./min.

The preforms' green density and porosity were determined after pyrolysis. The green densities were calculated from the mass and volumes of the preforms while the porosity and the pore size distributions were determined using a mercury porosimeter (Quantachrome Poremaster-60). Raman spectra were acquired with a Jobin-Yvon T64000 Raman spectrometer operating in a single spectrograph mode with an 1800 lines/mm grating. These measurements were performed in order to determine the uniformity of the resin coating. For each sample a line 1000 micron in length and consisting of 100 points was mapped in the central region of the sample using a motorized XY stage.

2.2. Infiltration

Figure 1:
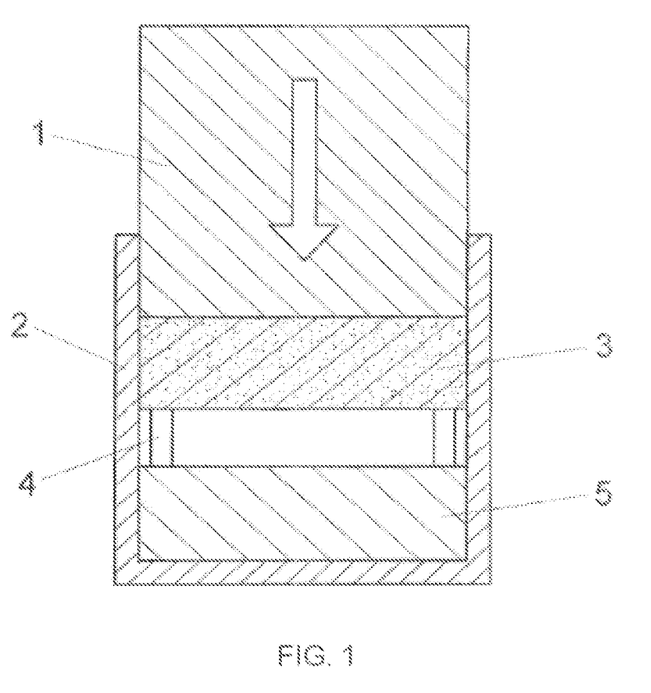
FIG. 1 is a schematic set-up for the infiltration experiments.

An excess amount of silicon powder (1-20 µm Goodfellow) was cold pressed into an 18 mm diameter tablet. This tablet is then placed in an hBN-coated graphite pot (FIG. 1). The diamond preform is placed on top of this Si tablet. Three SiC pieces of 2×2×3 mm size are used to separate these two tablets so that no reaction in the solid state, during heating up, can take place. An hBN-coated graphite piston covers the pot. The set-up was heated up at 50° C./min to 1500° C. at which temperature it dwelled for 30 minutes. Cooling was achieved at a rate of 20° C./min. Pressure (20 MPa) is applied onto the piston after the temperature exceeds that at which silicon melts (±1420° C.) to bring the preform and the melt into contact so that infiltration can commence. It is then released when the temperature reaches 1300° C. during cooling.

The products of the infiltration were cross-sectioned. The cross sections were polished using resin bonded diamond wheels with 1 µm diamond at 3000 rpm before characterization with SEM and XRD.

The phase composition of the infiltrated materials was determined by quantitative image analysis using image Tool3.

3. Results
3.1 Preforms

Figure 2:
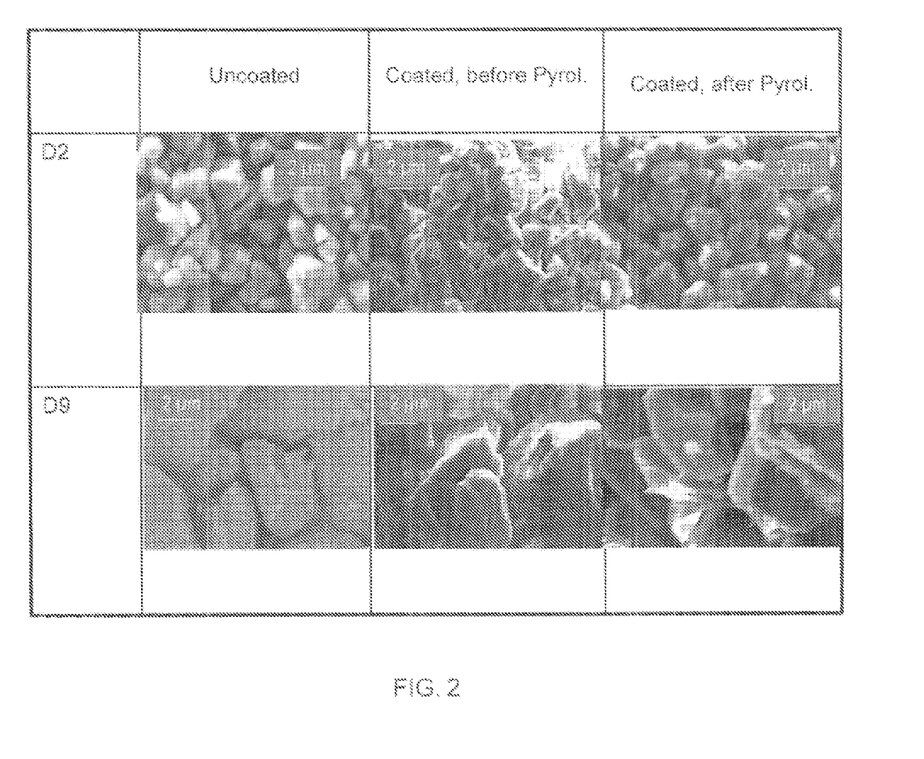
FIG. 2 is SEM micrographs diamond powders D2 and D9 showing the effect of coating the diamond. The micrographs show the powder before coating, fracture surfaces of the green compacts before pyrolysis, and fracture surfaces of the preforms before infiltration.
Figure 3:
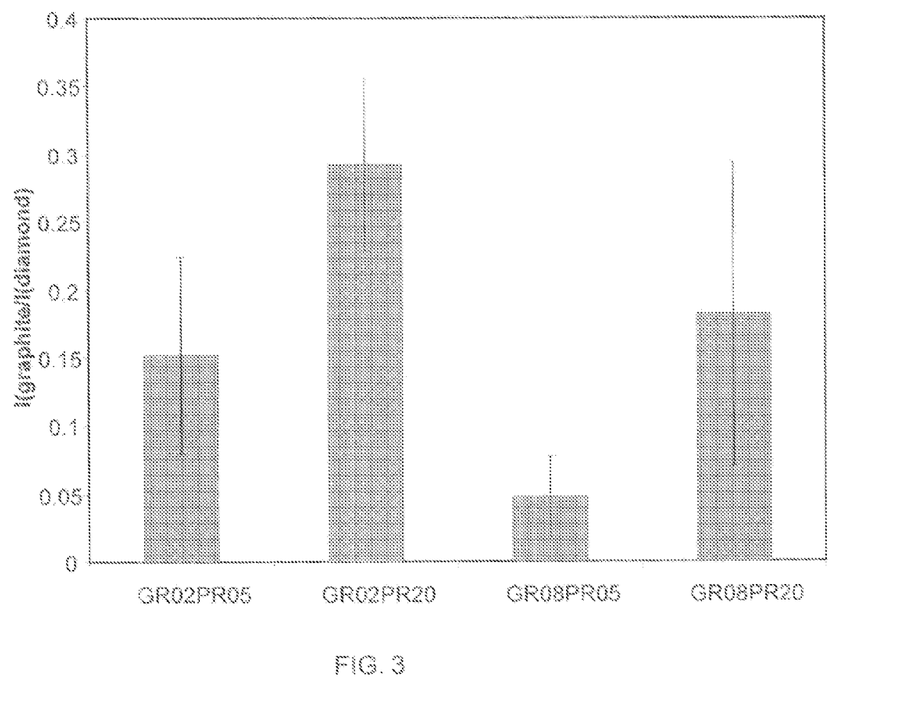
FIG. 3 is a graph showing average ratio of G-band intensity to diamond Raman peak intensity for the D2 and D9 diamonds with initial 5 and 20% resin after their pyrolysis.

SEM micrographs of two of the diamond powders used and the powders mixed with the resin are shown in FIG. 2. It can be inferred that the resin coated the diamond homogeneously both before and after pyrolysis. This was confirmed also by the Raman spectroscopy measurements. FIG. 3 indicates that both the materials produced from D2 and D9 which initially had 20% resin have thicker graphitic carbon layers than their 5% counterparts. The main graphitic carbon G-band gave fairly constant peak intensity in all samples for all the mapped points, indicating fairly uniform coverage by the resin.

Figure 4A:
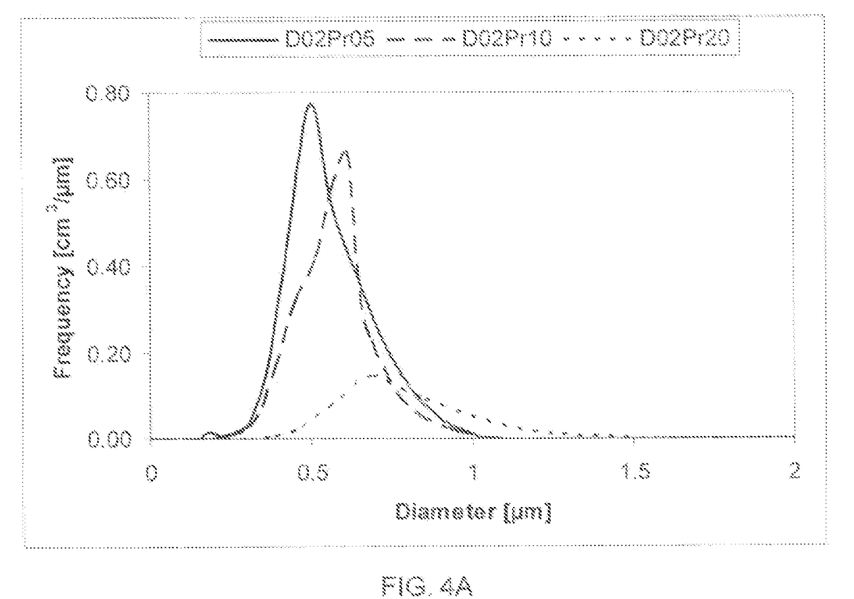
FIG. 4A is a graph of pore size distribution in D2 diamond preforms containing 5%, 10%, and 20% resin.
Figure 4B:
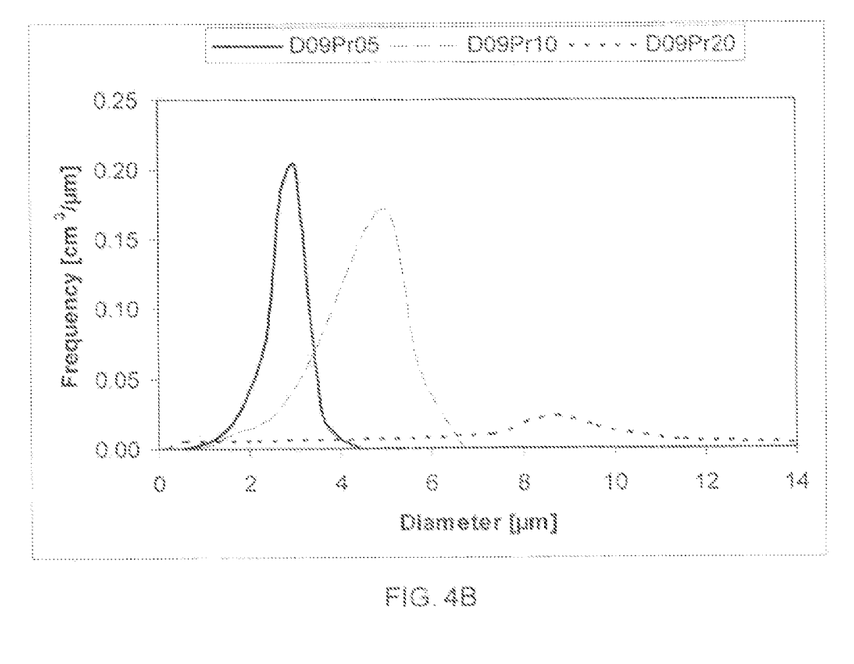
FIG. 4B is a graph of pore size distribution in D9 diamond preforms containing 5%, 10%, and 20% resin.
Figure 5A:
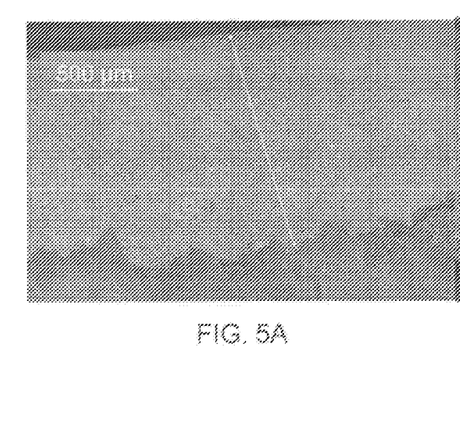
FIG. 5A is a SEM micrograph showing the infiltration depths of D2 containing 5% resin, after infiltration at 1500° C. for 30 minutes.
Figure 5B:
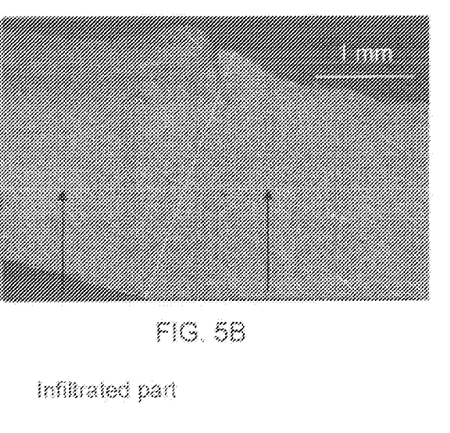
FIG. 5B is a SEM micrograph showing the infiltration depths of D2 containing 10% resin, after infiltration at 1500° C. for 30 minutes.
Figure 5C:
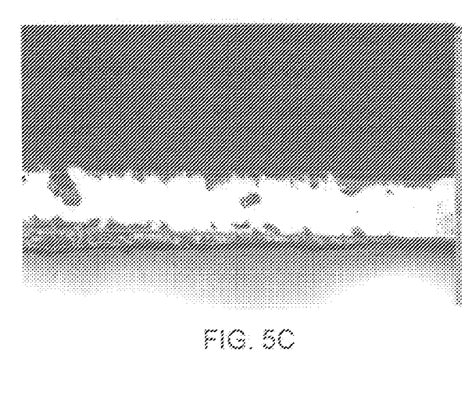
FIG. 5C is a SEM micrograph showing the infiltration depths of D2 containing 20% resin, after infiltration at 1500° C. for 30 minutes.
Figure 5D:
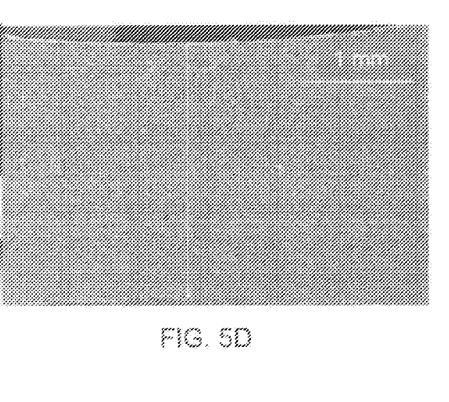
FIG. 5D is a SEM micrograph showing the infiltration depths of D9 containing 5% resin, after infiltration at 1500° C. for 30 minutes.

The pore size distribution determined by Hg-porosimetry is given in FIG. 4A and FIG. 4B for the preforms prepared from diamond powder D2 and D9. In Table 2 the green densities and mean pore channel diameter are given. An increase in the resin content increases the average pore diameter while decreasing the pore volume. The decrease of the pore volume is more pronounced for the smaller diamond grain sizes. Nevertheless the overall green density is nearly constant.

3.2 Infiltration Results

The results of the infiltration experiments for the different preforms are given in table 2. The micrographs in FIG. 5A, FIG. 5B, FIG. 5C, and FIG. 5D show the cross sections of infiltrated samples. The infiltration depth for the different materials is clearly visible. Increasing the amount of the resin in the preforms up to 10 wt % improves the infiltration of the green compacts for the materials produced from the low grain sizes diamonds, e.g. for the material D2Pr05 with 5% resin the infiltration depth was only 1250 μm and increases up to 2500 μm for the material with 10 wt % resin (D2Pr10).

The SEM micrographs of the polished sections in FIG. 6A, FIG. 6B, FIG. 6C, and FIG. 6D clearly indicate that the infiltrated areas are completely free of pores and with a high concentration of diamond. This could be confirmed by XRD. The black phase is diamond, the white (where present) is free silicon and the grey phase is SiC. While in the coarse grained product the presence of free silicon is obvious (the white phase), this is not detectable for the materials with the medium and fine diamond powders, where one can only see the black diamond phase and the grey SiC phase. The amount of diamond determined by image analysis could be slightly overestimated.

4. Discussion

As was shown previously[9] diamond is well wetted by liquid silicon at temperatures higher than 1450° C. Therefore a pressureless infiltration would be possible.

The infiltration is hindered by the formation of SiC surface layers on the diamond, which can block the pore channels and reduce the infiltration depth. Additionally the silicon will react with the added phenolic resign. The investigations of the reaction of liquid silicon with CVD-diamonds, glassy carbon and graphite has shown[9-11], that the reaction in all cases results in a very fast formation of protective SiC-layers with similar thickness. The reaction is faster for less crystalline carbon sources. In the infiltrated samples no residual non diamond carbon was observed. This indicates that the resin converts preferentially into SiC.

The fast reaction of the carbon with liquid silicon results in blocking of the pore channels and is also the reason why infiltration experiments so far were successful only with preforms made of diamonds having large pore sizes[3-4]. The reaction of silicon with diamond or other carbon sources is further enhanced by the strong exothermic character of the interaction of silicon with carbon. This results in a pronounced heat up of the system[10] and an acceleration of the reaction resulting in premature blocking of the pores.

The pyrolysed resin in the sample strongly changes the microstructure of preforms. It increases the pore channel diameter, e.g. by a factor of 1.5 times for D2Pr samples and by a factor of 3 for the samples with the medium grain size (D9).

Unfortunately at the constant pressure used for the preparation of the preforms the pore volume decreases with increasing resin content, i.e. pores between the diamond particles are filled by the pyrolysed resin. The reduction of the pore volume is more pronounced for the low grain size diamond composites (nearly 70%) whereas the change for the samples made with D9 powder it is only 38%. This reduction can be reduced by decreasing the pressure during compaction of the preform.

Small amounts of resin (5 wt %) are needed to make the pressing of the diamond powder possible. Without the presence of resin no pressed samples could be prepared. The resin coats the diamond particles (FIG. 2). This coating plastically deforms during pressing and glues the diamond particles together. With increasing resin content the resin will begin to fill the pores of the preform, during the pressing process, starting with the smaller ones. Therefore only the larger pores will remain and the overall porosity will be reduced. If the diamond particles had a constant packing density in the green body and the resin fills only the pores then the green density had to be increased with increasing resin content. In the investigated samples the density reduces slightly with the increasing resin content. This indicates that the distance between the diamond particles increases with increasing resin content.

To some extend the pore structure in the high resin content materials can be related also to the structure of the granulates prior to the pressing of the preform. However no inhomogeneity of the diamond, Si and SiC distribution was found after infiltration (FIG. 6A, FIG. 6B, FIG. 6C, and FIG. 6D).

This changed pore structure with increasing resin content will influence infiltration in the following ways:

The increase of the pore channel radius will improve the infiltration. Therefore for preforms with up to 10 wt % resin content a strong increase in the infiltration depth was observed.

The reduction of the overall porosity by deposition of the resin between the diamond particles will reduce the infiltration depth due to the possibility of blocking the pores. The volume increase during the reaction of diamond with liquid silicon is much larger than for the amorphous carbon or graphite with silicon. Therefore the reaction of the resin with liquid silicon will result in the blocking of the pores to a lesser extend. This will reduce the influence of the reduction in porosity. It was shown, that carbon preforms with overall densities less than 0.9 g/cm$^3$ can be fully converted into SiC[12]. Therefore the resin themselves with a density of less than 1 g/cm$^3$ can be converted completely. Therefore the medium resin content improves the infiltration and only high resin content decrease the infiltration due to the lower porosity. Therefore the reduction of the porosity has only a decisive influence on the infiltration at higher resin content (20%).

Figure 6A:
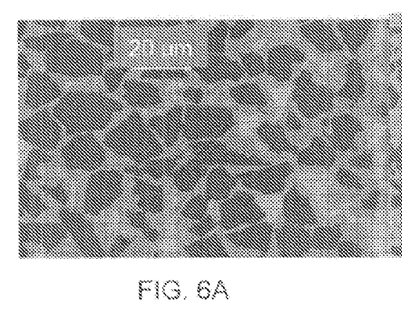
FIG. 6A is a typical backscattered SEM micrograph of a polished cross section of D17 containing 5% resin, after infiltration at 1500° C. for 30 minutes.
Figure 6B:
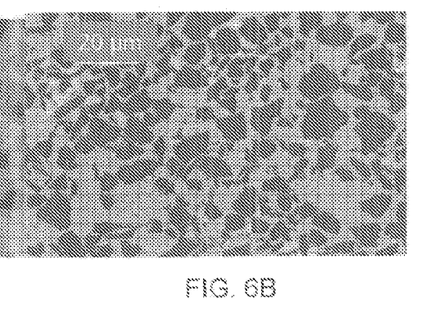
FIG. 6B is a typical backscattered SEM micrograph of a polished cross section of D9 containing 10% resin, after infiltration at 1500° C. for 30 minutes.
Figure 6C:
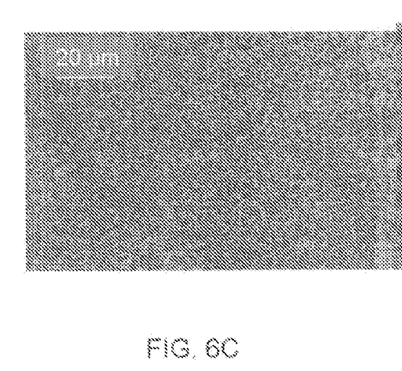
FIG. 6C is a typical backscattered SEM micrograph of a polished cross section of D2 containing 10% resin, after infiltration at 1500° C. for 30 minutes.
Figure 6D:
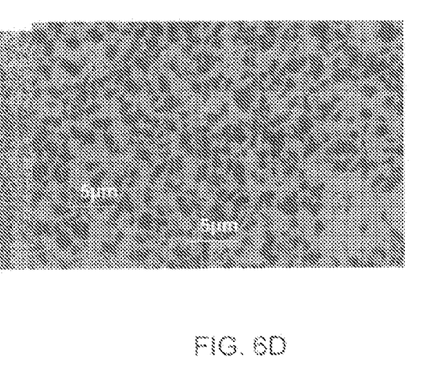
FIG. 6D is a typical backscattered SEM micrograph with higher magnification of a polished cross section of D2 containing 10% resin, after infiltration at 1500° C. for 30 minutes.

The study of the interaction of diamond with molten silicon has shown that after the onset of the interaction, a SiC layer of 5-10 μm thickness is formed very quickly on the surface of the diamond particles. The thickness of the layer is controlled by the density of the nuclei formed. If the amount of nuclei is large the thickness of the layer directly formed would be lower [9] and infiltration would be possible to a higher infiltration depth. A similar effect could be caused by the faster reaction of the pyrolysed resin, which would help improve the infiltration additionally. For the material D22Pr5 after 30 min infiltration the thickness of the SiC-layers formed on the diamonds can be estimated to be in the range of 2-5 μm. (FIG. 6A). This value is less than what was observed in model experiment with CVD-diamond plates[9].

The resin has the additional effect that a smaller amount of diamond is converted to SiC. Therefore high amounts of diamond were observed in our samples after infiltration.

The large grained products contain some free silicon due to their large pores in the preforms. The Si, which remains after formation of the dense SiC layer around the diamond, reacts only very slowly because this reaction is controlled by the diffusion through the SiC-layer[9, 11]. The medium and fine grained products have no detectable free silicon in them which is in agreement with this explanation.

5. Conclusion

The investigation of the infiltration of diamond preforms produced from mixtures of phenolic resin and diamond of different grain sizes from 1.5-17 μm can be summarized as follows:

1) The addition of the resin allows a simple shaping of preforms.
2) Increasing the amount of resin causes pronounced increases of the pore channel diameter and reduces the amount of porosity at similar green densities, because the resin fills partially the space in between the skeleton formed by the diamond particles.

3) Despite the fact that the overall porosity is reduced by adding the resin, the infiltration depth increases by a factor of two for the D2Pr10 in comparison to the D2Pr05. Similar effects were found for the samples with coarser grain size (D9Pr10).

4) For a larger resin content the infiltration depth decreases again strongly due to the much lower pore volume References The following references are included herein by reference.

1 Tomlinson P. N., Pipkin N. J., Lammer A. and Burnand R. P. Indust. High performance drilling-Syndax 3 shows versatility. Diamond Rev., 6 (1985) 299.
2 Qian J., Voronin G., Zerda T. W., He D. and Zhao Y. High-pressure, high-temperature sintering of diamond-SiC composites by ball-milled diamond-Si mixtures. J. Mater. Res., 17 (8) (2002) 2153.
3 Gordeev S. K, Danchukova L. V., Ekstroem T., Zhukov S. G. Method of manufacturing a diamond-silicon carbide composite and a composite produced by this method. CA2301775, 1999.
4 Gordeev S. K., Zhukov S. G., Danchukova L. V., Ekstrom T. Method of manufacturing a diamond-silicon carbide-silicon composite and a composite produced by this method. EP1253123, 2002.
5 Shimono M. and Kume S., HIP-Sintered Composites of C (Diamond)/SiC. J. Am. Ceram. Soc., 87 (4) (2004) 752.
6 Hall H. T., A Synthetic Carbonado. Science I, 169 (39) (1970) 865.
7 Hillig W. B., Making ceramic composites by Melt Infiltration. American Ceramic Society Bulletin, 73 (4) (1994) 56.
8 Ekimov E. A., Gavriliuk A. G., Palosz B., Gierlotka S., Dluzewski P., Tatianin E, Kluev Y., Naletov A. M. and Presz A. High-pressure, high-temperature synthesis of SiC-diamond nanocrystalline ceramics, App. Phys. Lett., 77 (2000) 954.
9 Mlungwane K., Sigalas I., Herrmann M. and Rodriguez M., The wetting behaviour and reaction kinetics in diamond0silicon carbide system. Submitted for publication In Diamond and Related Materials
10 Sangsuwan P., Tewari S. N. Gatica J. E., Singh R. N., and Dickerson R. Reactive Infiltration of Silicon Melt through Microporous Amorphous Carbon Preforms, Metallurgical and Materials Transactions B, 30B (1999) 933.
11 Zhou h., Singh R N. Kinetics model for the growth of silicon carbide by the Reaction of Liquid Silicon with Carbon. Journal of the American Ceramic Society 78 (9) (1995), 2456-2462
12 Siegel S., Petasch u., Boden G., Biogene Keramik-eine Alternative?, Keramische Zeitschrift, (2004), 4 234-238

TABLE 1

The mean particle size of the three diamond grades used in the experiments.

| Diamond grade | Mean particle size (µM) | |
|---|---|---|
| | D (v, 0.5) | D (v, 0.9) |
| D2 | 1.51 | 2.46 |
| D9 | 9.02 | 16.42 |
| D17 | 16.82 | 22.38 |

TABLE 2

A summary of the infiltration results of the preforms containing different amounts of resin.

| SAMPLE | DIAMOND POWDER | RESIN CONTENT, wt % | WEIGHT LOSS DURING PYROLYSIS, % | GREEN DENSITY (AFTER PYROLYSIS), g/cm³ | POROSITY, % | MEAN PORE DIAMETER, µm | INFILTRATION HEIGHT, µm | PHASE COMPOSITION, VOL % | | |
|---|---|---|---|---|---|---|---|---|---|---|
| | | | | | | | | Diamond | SiC | Si |
| D2PR05 | D2 | 5 | 1.86 ± 0.03 | 1.82 | 40 | 0.47 | 1250 | | | 0 |
| D2PR10 | | 10 | 4.11 ± 0.01 | 1.80 | 29 | 0.59 | 2500 | | | 0 |
| D2PR20 | | 20 | 8.73 ± 0.07 | 1.79 | 11 | 0.77 | 17 | 36 | 64 | 0 |
| D9PR05 | D9 | 5 | 2.00 ± 0.02 | 1.84 | 38 | 2.7 | 2000 | 46 | 51 | 3 |
| D9PR10 | | 10 | 4.10 ± 0.02 | 1.78 | 29 | 4.9 | 5000[1] | 53 | 47 | 0 |
| D9PR20 | | 20 | 9.00 ± 0.03 | 1.71 | 15 | 8.8 | 97 | | | 0 |
| D17PR05 | D17 | 5 | 2.2 ± 0.2 | 1.97 | 25 | 5.7 | 5000[1] | 52 | 40 | 8 |
| D17Pr10 | | 10 | | 2.17 | 30.2 | 6.8 | 5000[1] | | | |

[1] Fully infiltrated

The invention claimed is:

1. A method of producing an abrasive compact, the method comprising:
   (I) forming a feed diamond powder into a diamond perform;
   (II) interposing a separating mechanism between the diamond preform and a silicon infiltrant source, the separating mechanism configured to maintain separation between the diamond perform and the silicon infiltrant source until the silicon infiltrant is molten;
   (III) heating the diamond preform and silicon infiltrant source until the infiltrant is molten and the preform and infiltrant are isothermal; and
   (IV) allowing infiltration from the molten silicon infiltrant source to occur into the diamond preform.

2. The method of claim 1, wherein infiltration takes place with the application of pressure less than 1 kbar.

3. The method of claim 1, wherein the separating mechanism is removed.

4. The method of claim 1, wherein the feed diamond powder is coated with an amorphous carbon layer.

5. The method of claim 1, wherein the diamond is coated through pyrolysis of an organic binder.

6. The method of claim 1, wherein the compact comprises:
   a mass of diamond particles; and
   a binder phase comprising silicon,
   wherein the diamond particles are present in an amount less than 75 volume % and the binder phase comprises less than 5 volume % unreacted silicon or silicide.

7. The method of claim 2, wherein the separating mechanism is removed.

8. The method of claim 2, wherein the feed diamond powder is coated with an amorphous carbon layer.

9. The method of claim 3, wherein the feed diamond powder is coated with an amorphous carbon layer.

10. The method of claim 2, wherein the diamond is coated through pyrolysis of an organic binder.

11. The method of claim 3, wherein the diamond is coated through pyrolysis of an organic binder.

12. The method of claim 4, wherein the diamond is coated through pyrolysis of an organic binder.

* * * * *